(12) United States Patent
Farkas et al.

(10) Patent No.: US 10,447,583 B2
(45) Date of Patent: *Oct. 15, 2019

(54) PACKET PROCESSING TECHNIQUE FOR A COMMUNICATION NETWORK

(71) Applicant: Telefonaktiebolaget LM Ericsson (publ), Stockholm (SE)

(72) Inventors: János Farkas, Kecskemét (HU); Stefano Ruffini, Rome (IT); Balázs Varga, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 761 days.

This patent is subject to a terminal disclaimer.

(21) Appl. No.: 14/908,575

(22) PCT Filed: Nov. 9, 2015

(86) PCT No.: PCT/SE2015/051186
§ 371 (c)(1),
(2) Date: Jan. 29, 2016

(87) PCT Pub. No.: WO2017/082779
PCT Pub. Date: May 18, 2017

(65) Prior Publication Data
US 2018/0183708 A1    Jun. 28, 2018

(51) Int. Cl.
*H04L 12/721*    (2013.01)
*H04L 12/851*    (2013.01)
(Continued)

(52) U.S. Cl.
CPC .............. *H04L 45/38* (2013.01); *H04L 45/42* (2013.01); *H04L 47/24* (2013.01); *H04L 47/28* (2013.01); *H04L 47/34* (2013.01); *H04L 49/30* (2013.01)

(58) Field of Classification Search
CPC ......... H04L 45/38; H04L 47/28; H04L 49/30; H04L 45/42; H04L 47/24; H04L 47/34;
(Continued)

(56) References Cited

U.S. PATENT DOCUMENTS 6,611,519 B1 *  8/2003  Howe ................ H04L 12/5601
                                                370/386
7,324,510 B2 *  1/2008  Howe ................ H04L 12/5601
                                                370/386
(Continued)

OTHER PUBLICATIONS

IEEE8021ajD4 : Virtual Bridged Local Area Networks—Amendment 08: Two-Port Media Access Control (MAC) Relay (Year: 2009).*

(Continued)

*Primary Examiner* — Brian T O Connor
(74) *Attorney, Agent, or Firm* — Patent Portfolio Builders, PLLC

(57) ABSTRACT

The present disclosure generally relates to packet processing by a network element system that transfers first and second packet flows of the same traffic handling class (e.g., the Ethernet express traffic class). A method aspect performed by the network element system comprises the step of receiving, from a network controller, information defining opening times for packet gates associated with network element ports. The opening times define a relative transmission order among first packet flow packets and second packet flow packets. Upon receipt of first and second packet flow packets at the respective ports, the packet gates are controlled based on the received information to trigger transmission of the first and second packet flow packets in the predefined transmission order.

31 Claims, 11 Drawing Sheets

(51) Int. Cl.
  *H04L 12/717* (2013.01)
  *H04L 12/801* (2013.01)
  *H04L 12/935* (2013.01)
  *H04L 12/841* (2013.01)

(58) Field of Classification Search
  CPC ... H04L 49/10; H04L 49/254; H04L 49/3018; H04L 49/3027; H04L 49/3036; H04L 49/3045; H04L 49/3072; H04L 49/503; H04L 49/20; H04L 49/205; H04L 49/206; H04L 49/255; H04L 61/2517; H04L 49/354; H04L 69/322; H04L 69/168; H04L 29/06149; H04L 49/60; H04L 49/606
  USPC ........................................................ 370/235
  See application file for complete search history.

(56) References Cited

U.S. PATENT DOCUMENTS

| | | | |
|---|---|---|---|
| 8,477,616 B1 | 7/2013 | Rogers et al. | |
| 9,294,401 B2* | 3/2016 | Turanyi | H04L 47/10 |
| 9,813,384 B2* | 11/2017 | Howe | H04L 63/0428 |
| 10,078,528 B2* | 9/2018 | Bugenhagen | G06F 9/45558 |
| 2003/0189922 A1 | 10/2003 | Howe | |
| 2004/0081184 A1* | 4/2004 | Magill | H04L 49/3027 370/413 |
| 2005/0058149 A1* | 3/2005 | Howe | H04L 47/10 370/428 |
| 2005/0135356 A1* | 6/2005 | Muthukrishnan | H04L 47/30 370/389 |
| 2008/0080382 A1* | 4/2008 | Dahshan | H04L 45/302 370/235 |
| 2010/0250733 A1* | 9/2010 | Turanyi | H04L 47/10 709/224 |
| 2013/0044756 A1* | 2/2013 | Fourcand | H04L 12/43 370/395.42 |
| 2014/0219096 A1* | 8/2014 | Rabie | H04L 12/2852 370/235 |
| 2015/0049601 A1* | 2/2015 | Bugenhagen | H04L 41/0686 370/228 |
| 2015/0188804 A1* | 7/2015 | Ashwood-Smith | H04L 47/32 370/392 |
| 2015/0365338 A1* | 12/2015 | Pannell | H04J 3/0635 370/412 |
| 2016/0112896 A1* | 4/2016 | Karampatsis | H04W 28/0252 370/230.1 |
| 2016/0301601 A1* | 10/2016 | Anand | H04L 47/12 |
| 2016/0330074 A1* | 11/2016 | Cook | H04B 10/27 |
| 2017/0097842 A1* | 4/2017 | Bugenhagen | G06F 9/45558 |
| 2017/0262935 A1* | 9/2017 | Studnitzer | G06Q 40/04 |

OTHER PUBLICATIONS

IEEE, "IEEE Standard for a Precision Clock Synchronization Protocol for Networked Measurement and Control Systems", IEEE Std 1588 (Revision of IEEE Std 1588-2002), Jul. 24, 2008, 1-289.
Unknown, Author, "Bridges and Bridged Networks—Amendment: Enhancements for Scheduled Traffic", IEEE P802.1Qbv/D3.1 Draft Standard for Local and Metropolitan Area Networks, Sep. 22, 2015, 1-52.
Unknown, Author, "Bridges and Bridged Networks—Amendment: Frame Preemption", IEEE P802.1 Qbu/D3.0 Draft Standard for Local and Metropolitan Area Networks, Jul. 29, 2015, 1-35.
Unknown, Author, "Bridges and Bridged Networks—Amendment: Per-Stream Filtering and Policing", IEEE P802.Qci/D0.1 Draft Standard for Local and Metropolitan Area Networks, Sep. 3, 2015, 1-29.
Unknown, Author, "Draft Standard for Ethernet Amendment: Specification and Management Parameters for Interspersing Express Traffic", IEEE P802.3br/D2.2.(Amendment of IEEE Std 802.3-2015), Aug. 12, 2015, 1-56.
Office Action issued in application No. 15805645.7; dated Mar. 28, 2019; 07 pages.

* cited by examiner

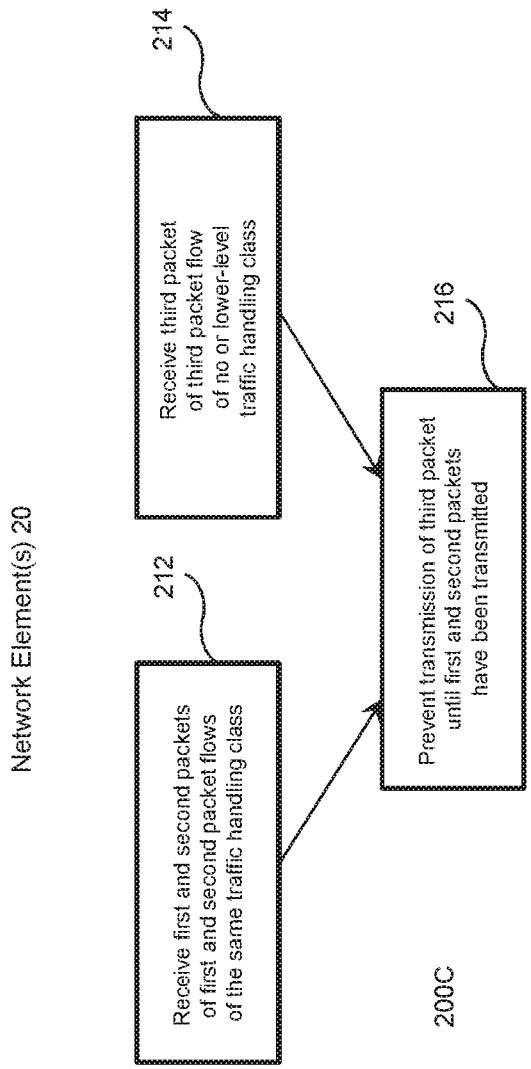

PACKET PROCESSING TECHNIQUE FOR A COMMUNICATION NETWORK

TECHNICAL FIELD

The present disclosure generally relates to communication networks. In particular, a packet processing technique for a communication network is described in which multiple packet flows are transferred. The technique may be implemented in the form of methods, devices, networks and computer programs.

BACKGROUND

Traffic generated by time critical applications has typically been transported in proprietary dedicated networks such as Cobranet, ISO/IEC 62439, 61158 or 61784, and Avionics Full-Duplex Switched Ethernet (AFDX). Recent developments attempt to move time critical traffic to packet networks, such as Layer 2 bridged networks, that also handle other traffic with less stringent requirements. As a result of these developments, commodity Ethernet with, for example, Audio Video Bridging (AVB) is being introduced and used in industrial automation, professional audio processing and vehicular networking.

Another area in which the introduction of Layer 2 bridged networks is being considered is the fronthaul domain of mobile communication networks. The fronthaul domain connects a mobile operator's radio equipment(s) and radio equipment controller(s). This connection has technically challenging latency and Packet Delay Variation (PDV) requirements as defined, for example, by the Common Public Radio Interface (CPRI). In view of these requirements, the fronthaul domain is presently not provided by bridged networks but by dedicated lambda connections in optical networks. On the other hand, the benefits of sharing network resources by time critical traffic and other traffic would also be an interesting option for the fronthaul domain in case latency and PDV can be kept low.

One approach to reduce latency and PDV for time critical traffic is the classification of different traffic types such that time critical traffic can be transported in the communication network with a higher priority than other traffic. In the Ethernet standard, for example, eight traffic classes are defined to permit a prioritized handling of individual traffic classes.

Newer developments in the Ethernet standard permit the declaration of one of the eight traffic classes as express traffic class that receives particular treatment in an Ethernet bridge to selectively reduce packet delay for the associated traffic. For example, the draft IEEE standards 802.1Qbu "Frame Preemption" and 802.3br "Interspersing Express Traffic" suggest suspending transmission of less time critical ("preemptible") traffic to the benefit of time critical express traffic. The draft IEEE standard 802.1Qbv "Enhancements for Scheduled Traffic", on the other hand, targets at a packet delay reduction by draining transmission queues with respect to a well-defined timing. All of these IEEE draft standards relate to the egress, or output, port of a network bridge.

The terms "egress" and "output" as well as "ingress" and "input", respectively, are used interchangeably herein. Also the terms "frame" and "packet" are used interchangeably herein.

It has been found that despite the various approaches to reduce delay and PDV in communication networks, an individual packet can still suffer from significant delay, and a packet flow from considerable PDV. As an example, the race of two simultaneously received express traffic packets of different packet flows for service at network element ports can result in a significant queuing delay for the packet losing the race as they share the same resources (namely the ones dedicated to express traffic). In addition to an increase of the overall packet delay, the losing packet flow additionally suffers from PDV accumulation as the losing packet flow in essence "inherits" the PDV of the winning packet flow.

The declaration of express traffic per se can therefore not guarantee a low delay and a low PDV for each and every express traffic packet flow. For example, frame preemption cannot help solving the race condition among time critical packet flows that all belong to the express traffic class. However, if racing situations for such packet flows cannot be controlled, then additional buffering is needed to reduce the PDV. On the other hand, such additional buffering will further increase the delay experienced by the buffered packets. Similar problems occur in other situations in which different packet flows of the same traffic handling class need to be processed in a communication network.

For the above reasons, applications that are particularly time critical still have to rely on proprietary dedicated networks. This is an unsatisfactory situation because Layer 2 Ethernet bridged networks and similar networks are readily available.

SUMMARY

There is a need for a packet processing technique that avoids one or more of the disadvantages of the prior art presented above, or other disadvantages.

According to a first aspect, a system comprising one or more network elements and configured to process at least first and second packet flows of the same traffic handling class is provided, wherein each network element has one or more ports. The system comprises a first port configured to handle first packet flow packets and a second port configured to handle second packet flow packets. The system further comprises a first packet gate associated with the first port and a second packet gate associated with the second port, each packet gate being selectively switchable between an open state for packet transmission and a closed state. The system also comprises at least one first interface configured to receive, from a network controller, information defining opening times for the first packet gate and the second packet gate, the opening times defining a relative transmission order among the first packet flow packets and the second packet flow packets. Still further, the system comprises at least one first processor configured to control the first and second packet gates based on the received information to trigger transmission of the first and second packet flow packets in the relative transmission order.

The traffic handling class may be indicative of time critical traffic. The first and second packet flows may have the same timing constraints (e.g., in terms of prioritized ingress and/or egress processing at a network element) since they belong to the same traffic handling class.

The packet handling by a particular port may in particular comprise receiving and/or transmitting one or more packets. Each of the first port and the second port may be configured as one of an ingress port and an egress port. A packet transmitted via an ingress port may be forwarded to and received by an egress port (e.g., of the same network element). A packet transmitted from an egress port may be sent towards and received by an ingress port of another network element.

The relative transmission order may be defined such that it controls the absolute or relative transmission time of the first and second packets. The transmission may be controlled in certain variants in accordance with a timing scheme. The timing scheme may be applied locally at the network element. Alternatively, the timing scheme may be applied globally within a transport network domain or within a larger communication network (e.g., for synchronizing the network elements included therein). The timing scheme may generally be defined by a local or global clocking mechanism.

In some cases, the timing scheme may be used to define ordered time slots for the first and second packet flow packets. The time slots may be applied locally at the network element or in a global manner (e.g., at a transport network domain level or at a larger communication network level). In one example, the time slots comprise at least one earlier time slot and at least one later time slot, wherein a first one of these two time slots is consistently allocated to a first packet flow packet and the second time slot is consistently allocated to a second packet flow packet. The time slots may be used to define ordered packet trains.

In one variant, the time slots immediately follow each other. In another variant, a guard interval is inserted between two successive time slots. The time slots may have the same size or different sizes.

The system presented herein may comprise multiple network elements. In such a case the multiple network elements may all apply the same time slot order for the first and second packet flow packets. It should be noted that the individual network elements may not necessarily be synchronized among each other. In such a case, one network element may apply its timing scheme in an unsynchronized manner with respect to another network element. Time slots of multiple network elements allocated to a particular packet flow may thus not be synchronized across the multiple network elements.

The one or more network elements may be located at any position in a communication network. As an example, the one or more network elements may be located at an edge of a transport network domain (e.g., at an edge towards upstream network elements sending the packets, such as the packet flow sources). In this case the relative transmission order of the first and second packet flow packets into the transport network domain can be defined. The transport network domain, in turn, may include one or more core elements in charge of transferring the first and second packet flows within the transport network domain. The network elements presented herein may also take the form of such core elements.

The first and second packet gates may in one variant be realized in a proprietary manner. In a second variant, the first and second packet gates may be configured to operate in a manner similar to IEEE 802.1Qbv.

The first and second ports may be packet ingress ports. In this case, the first and second packet gate may be configured to operate in a manner similar to IEEE 802.1Qbv when applied to ingress port processing. As an example, a packet buffer or packet queue may be provided at the ingress port before each packet gate to buffer or queue ingress packets when the respective packet gate is closed. Optionally, a transmission selection mechanism may be provided for selecting one, multiple or all of the buffered ingress packets for transmission via the respective packet gate in its open state.

The one or more network elements may each constitute or comprise one or more Two-Port Medium Access Control Relays (TPMRs). Each TPMR may provide at least one (e.g., exactly one) packet gate. In certain scenarios, the IEEE 802.1Qbv mechanism, when applied to an ingress port, may rely on functions or components provided by the TPMR.

In a first implementation, the system comprises at least one (e.g., exactly one) network element that, in turn, comprises the first and second ports, the first and second packet gates as well as the first interface and the first processor as described herein. In such a case the network element may constitute the system.

The at least one network element may comprise a first TPMR providing the first packet gate and a second TPMR providing the second packet gate. The first TPMR may be associated with the first port and the second TPMR may be associated with the second port. The first and second ports may be realized as packet ingress ports. Moreover, the at least one network element may be a Layer 2 network bridge.

In a second implementation, the system comprises at least one first network element that comprises the first port, the first packet gate, the first interface and the first processor. Moreover, the system comprises at least one second network element that comprises the second port, the second packet gate, a second interface (similar to the first interface) and a second processor (similar to the first processor). The first network element may constitute or comprise a first TPMR, with the first TPMR providing the first packet gate. The second network element may constitute or comprise a second TPMR, with the second TPMR providing the second packet gate.

In a first variant of the second implementation, the first network element and the second network element are configured as sources of the first packet flow and of the second packet flow, respectively.

In a second variant of the second implementation, the first network element is located between a first source of the first packet flow and a third network element at an edge of a transport network domain, and the second network element is located between a second source of the second packet flow and the third or fourth network element at the edge of the transport network domain.

A packet flow source may be realized as a radio equipment or as a radio equipment controller. For example, it may take the form of a Remote Radio Unit (RRU) or a Digital Unit (DU).

Each of the first and second packet flows may be a constant bitrate flow. For each constant bitrate flow, one or multiple different bitrates may be defined. The first and second packet flows may have a respective bitrate that equals a common base bitrate or that is a multiple of that common base bitrate.

The gate opening times may be configured to make arrival times of the first and second packet flow packets at one or more network elements downstream of the first and second packet gates (e.g., core elements of a transport network domain) deterministic. In this regard, one or more link delays between the network element(s) providing the one or more packet gates on the one hand and the one or more network elements downstream of the first and second packet gates may be considered when determining (e.g., calculating) the gate opening times. The link delays may be measured or determined otherwise.

In one implementation, at least one third packet flow having no traffic handling classification (e.g., not belonging to the Ethernet express traffic class) or a lower traffic handling classification than the first and second flows is processed by the system. In such a case a third packet flow packet may be received at at least one of the first and second ports. The processor may be configured to prevent a transmission of the third packet flow packet until the first and second packet flow packets have been transmitted. The transmission of the third packet flow packet may be prevented by prioritizing the transmission of the first and second packets in accordance with a technique as defined in at least one of IEEE 802.1Qbv, IEEE 802.1Qbu and IEEE 802.3br.

The third packet flow packet may bypass the first and second packet gates. In other words, the gating function presented herein may generally not be applied to packet flows having no traffic handling classification or lower traffic handling classification than the first and second (and possibly one or more further) packet flows.

The packet flows processed in the system may generally constitute Ethernet layer traffic. Additionally, or in the alternative, one or more of the packet flows, in particular the first and the second packet flows, may constitute CPRI packet flows.

According to a further aspect, a network controller configured to control processing of at least first and second packet flows of the same traffic handling class by a system having a first packet gate associated with the first packet flow and a second packet gate associated with the second packet flow is provided. Each packet gate is selectively switchable between an open state for packet transmission and a closed state. The network controller comprises a processor configured to determine information defining opening times for the first packet gate and the second packet gate, the opening times defining a relative transmission order among the first packet flow packets and the second packet flow packets. The network controller further comprises an interface configured to send the information to the system, wherein the information is configured to program opening times of the first packet gate and the second packet gate.

Information defining the relative transmission order may be sent controller to multiple network elements in the system to define the same packet order throughout a communication network. The corresponding information may be identical for all network elements or may be different for different network elements.

As explained above, the relative transmission order may be defined by gate opening times. The network controller may calculate the gate opening times. To this end, the network controller or any network element that communicates with the network controller may be capable of measuring network delay parameters.

As an example, the gate opening times may be calculated based on a residence time of the first and second packet flow packets in a particular network element. Alternatively, or in addition, the gate opening times may be calculated based on one or more link delays. Additionally, or in the alternative, the gate opening times may be calculated based on a bitrate underlying at least one of the first and second packet flows. Alternatively, or in addition, the gate opening times may be calculated based on a packet sending time of one or more upstream network elements sending the first and second packet flow packets to the first and second gate, respectively. The one or more receiving network elements may generally be located at an edge of a transport network domain. The upstream network elements may be located outside the transport network domain and directly interface the receiving network element.

The network controller may be implemented as controlling entity of a Software Defined Network (SDNc). In general, the network controller may be configured to perform the steps of any of the methods and method aspects presented herein.

A still further aspect is directed to a communication network comprising the network element system as presented herein and the controller as presented herein. The system may be comprised by or interface a fronthaul network domain.

According to a further aspect, a method of operating a system comprising one or more network elements is provided, wherein the system is configured to process at least first and second packet flows of the same traffic handling class. Each network element has one or more ports, and the system has a first packet gate associated with a first port and a second packet gate associated with a second port. Each packet gate is selectively switchable between an open state for packet transmission and a close state. The method comprises receiving, from a network controller, information defining opening times for the first packet gate and the second packet gate, the opening times defining a relative transmission order among the first packet flow packets and the second packet flow packets. The method further comprises handling first packet flow packets at the first port and second packet flow packets at the second port, and controlling the first and second packet gates based on the received information to trigger transmission of the first and second packet flow packets in the relative transmission order.

According to a still further aspect, a method of operating a network controller is presented, wherein the network controller is configured to control processing of at least first and second packet flows of the same traffic handling class by a system having a first packet gate associated with the first packet flow and a second packet gate associated with the second packet flow. Each packet gate is selectively switchable between an open state for packet transmission and a closed state. The method comprises determining information defining opening times for the first packet gate and the second packet gate, the opening times defining a relative transmission order among the first packet flow packets and the second packet flow packets. The method further comprises sending the information to the system, wherein the information is configured to program the opening times of the first packet gate and the second packet gate.

Also provided is a computer program product comprising program code portions to perform the method and method steps presented herein when the computer program product is executed by one or more processors. The one or more processors may be located on an individual network node or may be comprised by a distributed computing system. The computer program product may be stored on a computer-readable recording medium such as a semiconductor memory, DVD-ROM, CD-ROM, and so on. The computer program product may also be provided for download via a communication connection.

BRIEF DESCRIPTION OF THE DRAWINGS

In the following, embodiments and exemplary aspects of the present disclosure will be described in more detail with reference to the drawings, in which:

FIG. 2D illustrates a flow chart of a further method embodiment performed by one or more network elements in accordance with the present disclosure;

DETAILED DESCRIPTION

In the following description, for purposes of explanation and not limitation, specific details are set forth, such as particular network protocols and particular network elements, in order to provide a thorough understanding of the present disclosure. It will be apparent to one skilled in the art that the present disclosure may be practiced in other embodiments that depart from these particular details.

Those skilled in the art will further appreciate that the functions, steps and services described herein may be implemented using individual hardware circuitry, using software functioning in conjunction with a programmed processor or general purpose computer, using an Application Specific Integrated Circuit (ASIC), and/or using one or more Digital Signal Processors (DSPs). It will also be appreciated that while the present disclosure is primarily described in the context of methods and devices, it may also be embodied in one or more processors and one or more memories coupled to the one or more processors, wherein the one or more memories are encoded with one or more programs that, when executed on the one or more processors, perform the functions, steps and services disclosed herein.

Figure 1A:
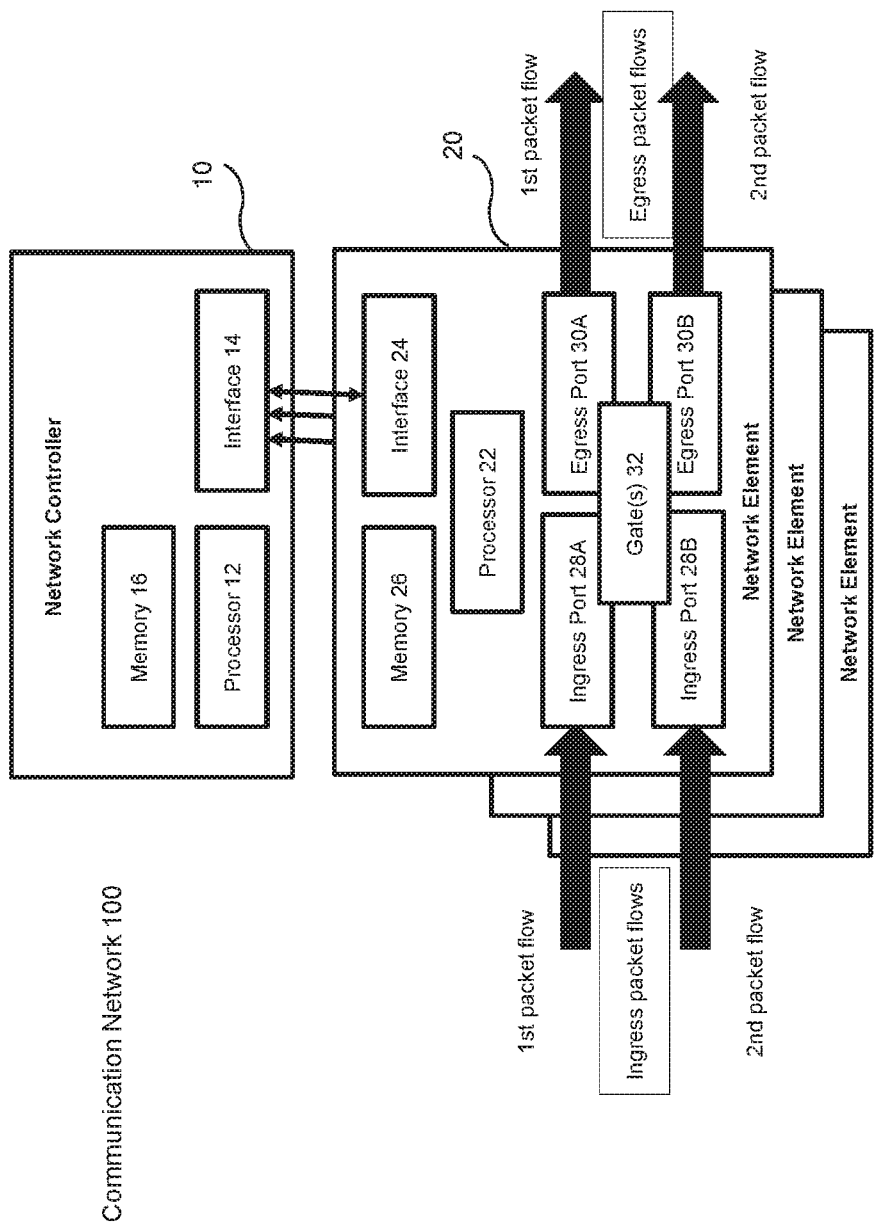
FIG. 1A illustrates an embodiment of a communication network with a network controller embodiment and one or more network element embodiments in accordance with the present disclosure.

FIG. 1A illustrates an embodiment of some components of a communication network 100. As illustrated in FIG. 1A, the communication network 100 comprises a network controller 10 as well as one or more network elements 20 in communication with the network controller 10. It will be appreciated that the communication network 100 comprises additional components not illustrated in FIG. 1A.

The network controller 10 of FIG. 1A is configured to control packet processing by the one or more network elements 20. To this end, the network controller 10 comprises a processor 12 and an interface 14 configured to communicate with the one or more network elements 20. The network controller 10 further comprises a memory 16 with program code that, when executed by the processor 12, configures the network controller 10 to implement the methods and method aspects of the present disclosure.

In a similar manner, each network element 20 comprises a processor 22, an interface 24 and a memory 26. The interface 24 is configured for communication with the network controller 10. The memory 26 stores program code that, when executed by the processor 22, configures the network element 20 to implement the methods and method aspects of the present disclosure.

The processor 22 is configured to control packet ingress and egress processing operations. These processing operations may, for example, comprise Layer 2 processing. In some variants, the network element 20 may thus be configured as a Layer 2 Ethernet bridge or switch within the communication network 100.

As illustrated in FIG. 1A, the network element 20 further comprises one or more ingress ports 28A, 28B as well as one or more egress ports 30A, 30B. Each ingress port 28A, 28B is configured to handle one or more ingress packet flows, and each egress port 30A, 30B is configured to handle one or more egress packet flows. Ingress port packet handling may comprise receiving packets and forwarding the packets (after one or more optional ingress processing operations) to an egress port 30A, 30B. Egress port packet handling may comprise receiving packets from an ingress port 28A, 28B and transmitting the packets (after one or more optional egress processing operations) towards another component in the communication network 100. To each individual ingress port 28A, 28B and to each individual egress port 30A, 30B one or more ingress and egress packet flows, respectively, may be allocated.

Each network element 20 further comprises one or more packet gates 32. Each packet gate 32 is associated with a dedicated ingress port 28A, 28B or a dedicated egress port 30A, 30B. In certain variants, one packet gate 32 is provided for each ingress port 28A, 28B, and no packet gate 32 is provided for any egress port 30A, 30B. In other variants, only the egress ports 30A, 30B are provided with packet gates 32. Both variants can be considered as needed.

Each packet gate 32 is selectively switchable between an open state for packet transmission and a closed state. In the open state of an ingress port packet gate 32, packets can be forwarded from a respective ingress port 28A, 28B to a respective egress port 30A, 30B. In the open state of an egress port packet gate 32, packets can be transmitted by a respective egress port 30A, 30B to one or more downstream network elements 20.

The processor 22 is configured to control the packet gates 32 based on information received from the network controller 10 via the interface 24. The information defines opening times for the one or more packets gates 32. The opening times define a relative transmission order among packets of different packet flows being dammed by different packets gates 32 of one or multiple network elements 20. The information received from the network controller 10 thus permits the one or more network elements 20 to trigger transmission of packets belonging to different packet flows in a predefined relative transmission order.

Figure 1B:
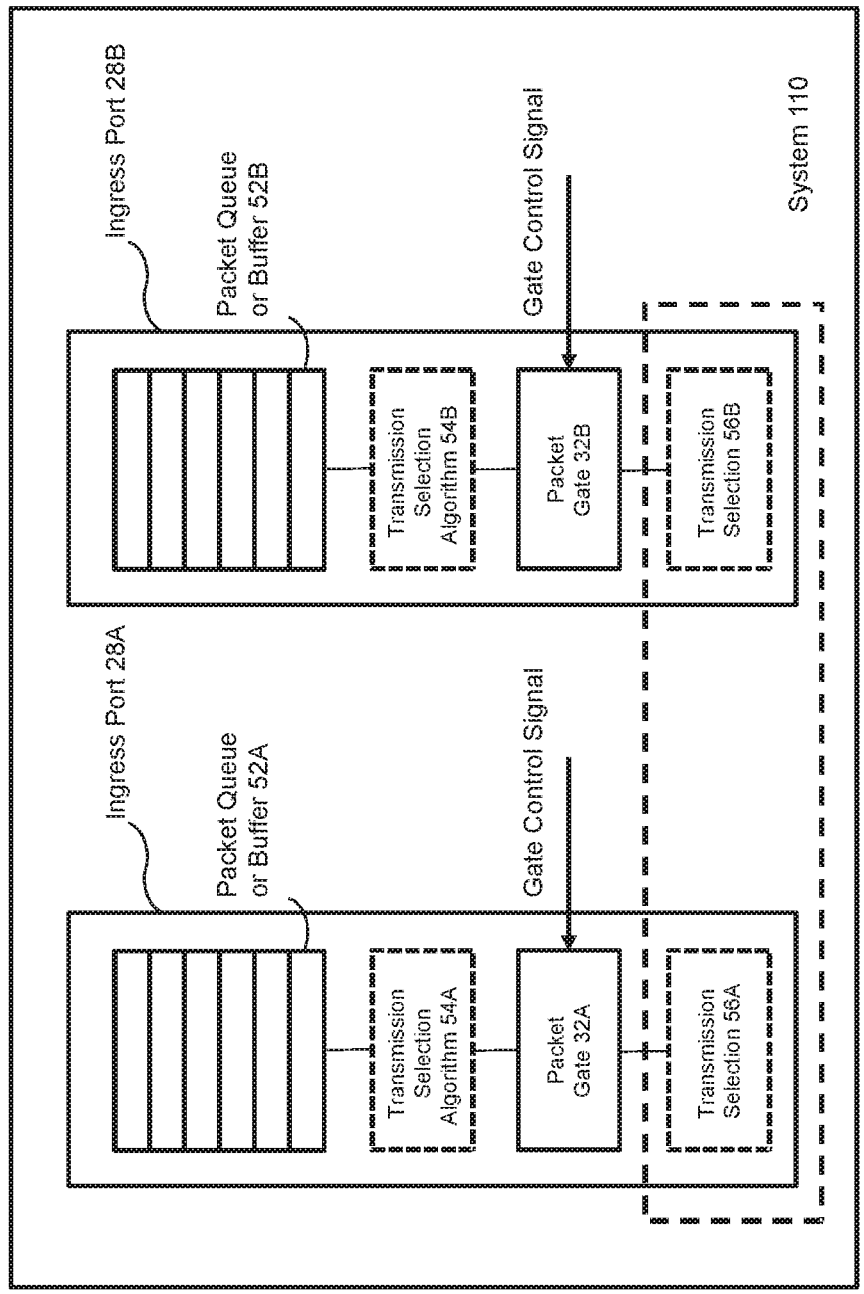
FIG. 1B illustrates an embodiment of a system comprising a first packet gate and a second packet gate in accordance with the present disclosure.

FIG. 1B illustrates in more detail a system 110 comprising a first transmission gate 32A as part of a first ingress port 28A as well as second transmission gate 32B as part of a second ingress port 28B. The first ingress port 28A and the second ingress port 28B may belong to a single network element 20 (as illustrated in FIG. 1A) or to two different network elements 20 (each configured as shown for one exemplary network element 20 in FIG. 1A). Of course, the ingress port configuration of FIG. 1B is equally applicable an egress port 30A, 30B (not shown in FIG. 1B)

As further illustrated in FIG. 1B, each ingress port 28A, 28B comprises a packet queue or packet buffer 52A for temporarily storing incoming packets of one or more dedicated ingress packet flows. To each individual ingress port 28A, 28B, one or more individual ingress packet flows may be allocated. Such an allocation may be performed by the network controller 10 or any other network component.

In certain variants, only packets belonging to one or more packet flows of a particular (e.g., prioritized) traffic handling class are temporarily stored in the packet queue or packet buffer 52A, 52B of a particular ingress port 28A, 28B. Packets from other packet flows, such as packet flows having no particular traffic handling classification or belonging to a less-prioritized traffic handling class, simply bypass the respective packet queue or packet buffer 52A, 52B, the associated transmission gate 32A, 32B and, optionally, one or more further ingress port components as shown in FIG. 1B.

The further ingress port components of FIG. 1B include per ingress port 28A, 28B an optional transmission selection algorithm 54A, 54B located between the respective packet queue or packet buffer 52A, 52B and the respective packet gate 32A, 32B. Additionally, an optional transmission selection function 56A, 56B is provided downstream of each packet gate 32A, 32B. In certain variants, the transmission selection algorithms 54A, 54B and the transmission selection functions 56A, 56B are operated by the processor 22, or the processor of any other network element 20, in a manner as defined in IEEE 802.1Qbv. In case the ingress ports 28A, 28B belong to a single network element 20, the transmission selection functions 56A and 56B may be realized in the form of a single function (as illustrated by dashed lines in FIG. 1B).

The operation of each packet gate 32A, 32B in the exemplary scenario of FIG. 1B is to connect or disconnect the respective transmission selection algorithm 54A, 54B from the associated transmission selection function 56A, 56B to selectively enable or disable the forwarding process from the respective ingress port 28A, 28B to an associated egress port 30A, 30B (see FIG. 1A).

The state of each packet gate 32A, 32B is controlled by a gate control signal. The gate control signal is generated by the processor 22. The gate control signal is generated based on information defining gate opening times as received via the interface 24 from the network controller 10. It will be understood that any second network element 20 possibly comprising the second ingress port 28B will have a corresponding second processor and a corresponding second interface with the same functionalities.

The gate control signal may be generated in accordance with a gate control list as generally described in IEEE 802.1Qbv. In this regard, a cycle timer state machine will be provided to initiate the execution of the gate control list and to ensure that a gating cycle time defined for the ingress ports 28A, 28B is maintained. In case the ingress ports 28A, 28B belong to two different network elements 20, the two network elements 20 may be synchronized to apply the same timing scheme so as to permit the definition of a consistent relative transmission order between packets belonging to different packet flows received via the ingress ports 28A, 28B, respectively. The synchronization may, for example, be performed using the Precision Time Protocol (PTP) in accordance with IEEE 1588.

Figure 2B:
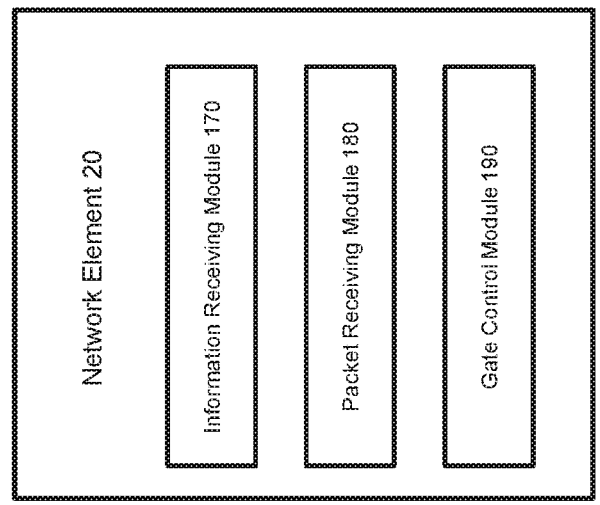
FIGS. 2A and 2B illustrate a further network controller embodiment and a further network element embodiment in accordance with the present disclosure.
Figure 2A:
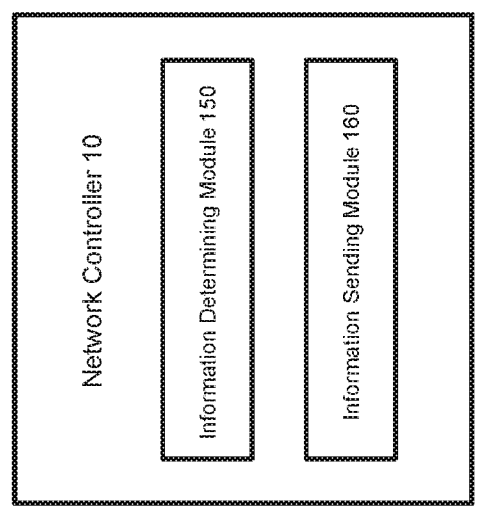

FIGS. 2A and 2B show functional embodiments of the network controller 10 and of one of the network elements 20, respectively. These functional embodiments may be based on the structural embodiments discussed above with reference to FIGS. 1A and 1B.

As illustrated in FIG. 2A, the network controller 10 comprises an information determining module 150 and an information sending module 160. The network element 20 comprises an information receiving module 170, a packet receiving module 180 and a gate control module 190. Each of the network controller 10 and the network element 20 may comprise one or more further modules as needed.

Figure 2C:
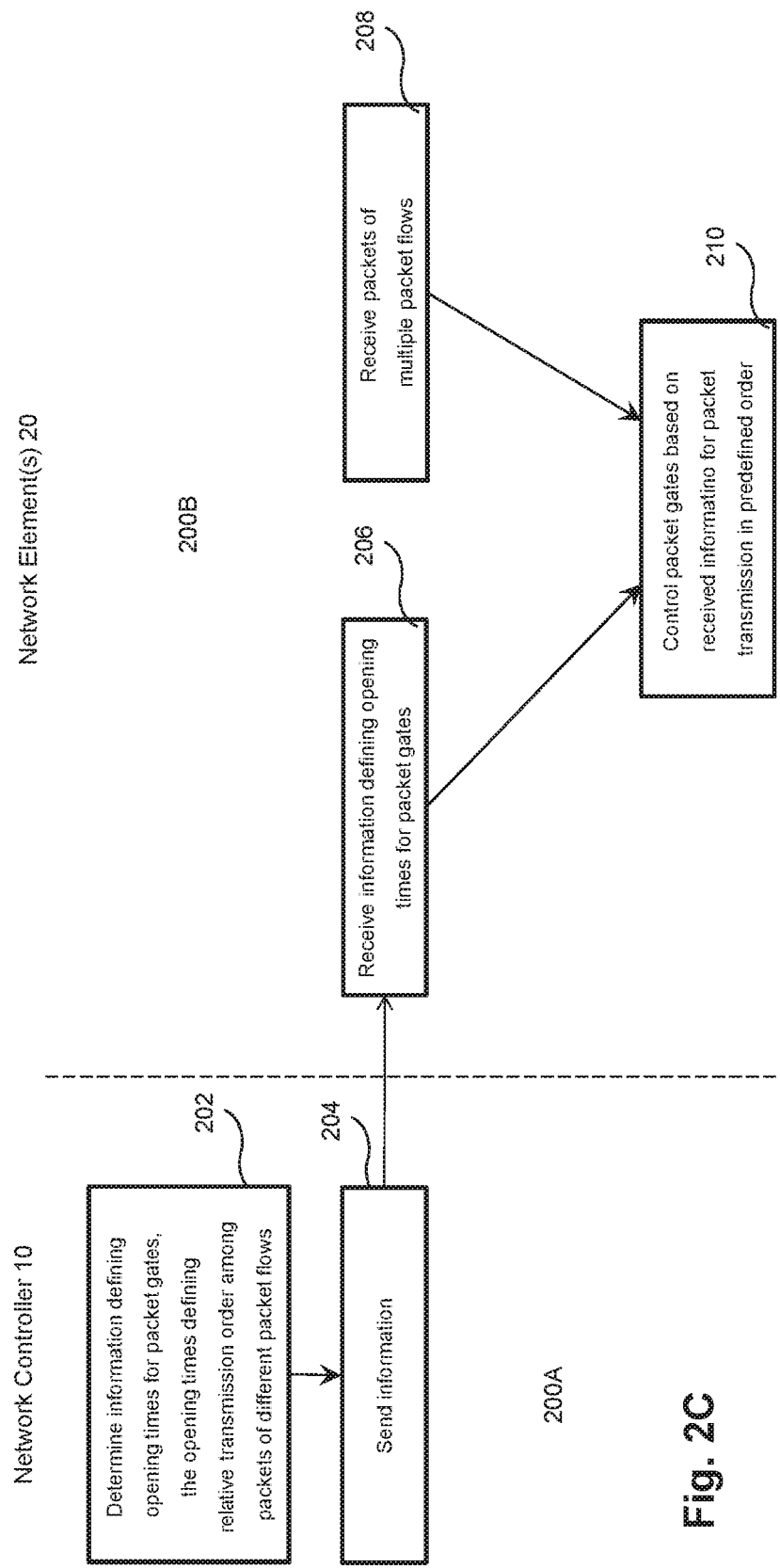
FIG. 2C illustrates flow charts of a method embodiment performed by a network controller and a method embodiment performed by a network element in accordance with the present disclosure.

FIG. 2C illustrates in two flowcharts 200A, 200B exemplary method embodiments performed by the network controller 10 and one or more network elements 20, respectively. The network controller 10 and the one or more network elements 20 may be configured as explained above with reference to FIGS. 1A, 1B, 2A and 2B, respectively.

The method embodiments generally target at avoiding race conditions among packet flows of the same traffic handling class. This traffic handling class may in particular be a prioritising, or express, class that prioritizes time critical traffic in the communication network 100 over other ("background") traffic having less time critical constraints. As an example, the time critical traffic can be fronthaul traffic between one or more radio items of equipment and one or more radio equipment controllers. In such a scenario, the one or more network elements 20 illustrated in FIG. 1A may be located between the one or more items of radio equipment and the one or more radio equipment controllers and constitute a portion of, or the complete, fronthaul connection. The background traffic, on the other hand, may be any other traffic that is less time critical. It will be appreciated that the fronthaul connection is just one example, and that the present disclosure can also be implemented in other scenarios, such as industrial automation, vehicular networking, avionics, and so on.

As shown in FIG. 2C, the operations performed by the network controller 10 include a step 202 of determining "time gating" information defining opening times for multiple packet gates 32, such as the packet gates 32A, 32B illustrated in FIG. 1B. As explained above, the packet gates 32A, 32B may belong to a single network element 20 or to two different (but synchronized) network elements 20 within the communication network 100.

The opening times for the two or more packet gates 32A, 32B are defined by the processor 12 of the network controller 10 such that a relative transmission order among packets belonging to different packet flows handled by the packet gates 32A, 32B can be achieved. The information determined by the processor 12 in step 202 may take the form the gate control list as defined in IEEE 802.1Qbv. It will be appreciated that such a gate control list could also be defined for a particular network element 20 in case that network element 20 includes only a single packet gate 32.

Assume an exemplary scenario in which a first packet flow is allocated to a first ingress port 28A having a first packet gate 32A, and a second packet flow is allocated to a second ingress port 28B having a second packet gate 32B. Assume further that the first packet flow and the second packet flow have the same constant bitrate. In such a case the gate opening times of the first packet gate 32A and the second packet gate 32B may be defined such that, on a common timeline, transmission of a first packet flow packet via ingress port 28A is followed by transmission of a second packet flow packet from ingress port 28B, which in turn is followed by a further transmission of a first packet flow packet by ingress port 28A, and so on. The gate opening times may be defined such that there exists a predefined time interval between the transmission of a first packet flow packet from ingress port 28A and the transmission of a second packet flow packet from ingress port 28B.

It will be appreciated that in other examples the constant bitrate of the first packet flow may differ from the constant bitrate of the second packet flow. Also in such a case, a predefined relative transmission order between first packet flow packets and second packet flow packets can be achieved. As an example, in case the constant bitrate of the first packet flow is twice the constant bitrate of the second packet flow, two first packet flow packets will always be followed by one second packet flow packet, which again will be followed by two first packet flow packets, and so on.

Once the "time gating" information has been determined by the processor 12 in step 202, it is sent via the interface 14 of the network controller 10 to one or more network elements 20 to program their gate opening times.

Referring now to the operations of one individual network element 20 as illustrated in flow chart 200B of FIG. 2C, the information sent by the network controller 10 in step 204 is received by the individual network element 20 in step 206. The information is received via the interface 24 as shown in FIG. 1A and will then be forwarded to the processor 22 for further processing and/or will be stored in the memory 26 for being accessed by the processor 22 as needed.

In a further step 208, packets belonging to one or more packet flows are received via the one or more ingress ports 28A, 28B of the network element 20. The packets of different packet flows may be received at an individual ingress port 28A, 28B encapsulated in a single data transport entity (such as a higher-level packet) and may need to be decapsulated prior to any further processing. Alternatively, or in addition, the packets of different packet flows arriving at the same ingress port 28A, 28B may be identified by a common identifier, such as a common ingress port identifier or Virtual Local Area Network Identifier (VID).

Step 208 and step 206 can be performed in any order. Typically, step 206 will precede step 208, but step 206 may be repeated multiple times while step 202 is continuously performed.

In certain scenarios, a particular network element 20 will receive in step 208 only a single packet flow at a dedicated ingress port 28A. In such a scenario, in step 206 opening times for an associated ingress port packet gate 32A may be received. In parallel, another network element 20 may receive at a dedicated further ingress port 28B another packet flow and, from the network controller 10, information pertaining to the opening times of an associated further ingress port packet gate 32B.

In step 210, the network element 20 controls the first ingress port packet gate 32A based on the information received in step 206 to trigger transmission of one or more first packet flow packets. The same network element 20, or another network element 20, controls a second ingress port packet gate 32B based on the information received in step 206 to trigger transmission of one or more second packet flow packets. The opening times at the first and second ingress port packet gates 32A, 32B are synchronized such that the first and second packet flow packets are transmitted, or forwarded, by the respective ingress port 28A, 28B in a predefined transmission order to the associated egress port 30A, 30B.

FIG. 2D shows a flow chart 200C of another mode of operation of one or more network elements 20. The steps illustrated in FIG. 2D may be performed in parallel to the steps illustrated in FIG. 2C.

In step 212, a particular network element 20 receives first and second packets of first and second packet flows of the same (e.g., higher-level) traffic handling class. In step 214, the network element 20 receives a third packet of a third packet flow of no dedicated traffic handling class or of a lower-level traffic handling class.

It will be appreciated that steps 212 and 214 can be performed in parallel. In certain cases, step 212 can be performed by two different network elements 20, wherein a first network element 20 receives the first packet of the first packet flow and a second network element 20 receives the second packet of the second packet flow.

Then, in step 216, transmission of the third packet is prevented until the first and second packets have been transmitted. In case the network element 20 only receives the first packet of the first packet flow (because another network element 20 receives the second packet of the second packet flow) and further receives the third packet of the third packet flow, transmission of the third packet will be prevented until the first packet has been transmitted. In a similar manner, in case the third packet of the third packet flow is received by the second network element 20, transmission of the third packet will be prevented until the second packet has been transmitted.

The operation illustrated in FIG. 2D can, for example, be implemented to ensure that packets of prioritized packet flows receive a prioritized handling over packet flows that belong to background traffic. Step 216 may thus in particular be performed at an egress port 30A, 30B of the network element 20 (e.g., in accordance with one or more of IEEE 802.1Qbv, IEEE 802.1Qbu and IEEE 802.3br).

On the other hand, the third packet of the third packet flow received in step 214 may bypass any time gating operation in the respective network element 20. Such a packet may thus, for example, be immediately forwarded (optionally after one or more regular ingress processing operations) to the respective egress port 30A, 30B, without being specifically queued or buffered or being subjected to a transmission selection operation in connection with an ingress-side time gating mechanism (see FIG. 1B).

In certain variants, the one or more network elements 20 may be located at an edge of a transport network domain (e.g., may constitute an edge node) towards one or more network elements that are located outside the transport network domain and that send the packets (e.g., the packet flow sources). In such a case the one or more network elements 20 may thus control the relative transmission order of the packets of different packet flows into the transport network domain by the packet gate control operation in step 212. By selectively delaying the entry of packets of an individual packet flow into the transport network domain already upon entry, a racing-less transport through the transport network domain may be facilitated. Additionally, packet delay and PDV become better trackable and deterministic by the "programming" of the one or more network elements 20 by the network controller 10 via the information sent by the network element 10 in step 204. Of course, in certain variants also the core elements in the transport network domain may be programmed in this manner.

As has been explained above, the technique presented herein is particularly beneficial in connection with constant bitrate packet flows having bitrates that equal or are multiples of a common base bitrate. In such a case the packet arrival times for an individual packet flow and the relative packet arrival times across multiple packet flows become deterministic from the perspective of an individual network element 20. Of course, the gate operating times may be determined in step 202 not only based on the current (constant) bitrate of an individual packet flow, but could additionally take into account one or more of packet residence times at network elements, link delays and packet sending times (e.g., from the packet flow source).

The relative transmission order may be defined via the gate opening times such that it controls the relative transmission order of the packets in accordance with a timing scheme that is locally applied at the network element 20 or on a global scope (e.g., across a larger set of network elements 20). That timing scheme may be used to define ordered time slots for the transmission of packets from different packet flows. In particular, for each packet flow of the particular traffic handling class (e.g., the Ethernet express traffic class) a dedicated time slot may be reserved by each network element 20. In certain variants, the same time slot order for the packet flows of the same traffic handling class is applied across multiple, preferably synchronized network elements 20. The time slot concept thus particularly benefits from the packet flows being constant bitrate flows that have been derived from a common base bitrate as explained above.

It will be appreciated that the packet buffering or queuing (see reference numerals 52A and 52B in FIG. 1B) may result in a certain additional delay for packets of an individual packet flow. On the other hand, PDV for all packet flows can be substantially reduced, and the PDV requirements of time critical applications are typically much more stringent than the associated delay requirements. As such, the network elements 20 can handle incoming time critical traffic (e.g., CPRI traffic) with minimal efforts in terms of de-jittering (as typically required to reduce PDV) and additional buffering.

Moreover, the technique presented herein can easily be combined with egress port traffic prioritization schemes such as one or more of IEEE 802.1Qbv, IEEE 802.1Qbu and IEEE 802.3br (that per se could not protect one time critical packet flow from another time critical packet flow). As such, also the impact of background packet flows on time critical packet flows can be reduced.

In the following description of further embodiments of the present disclosure, that are partially based on the embodiments discussed above, a radio network fronthaul scenario will be discussed in more detail with reference to FIG. 3.

Figure 3:
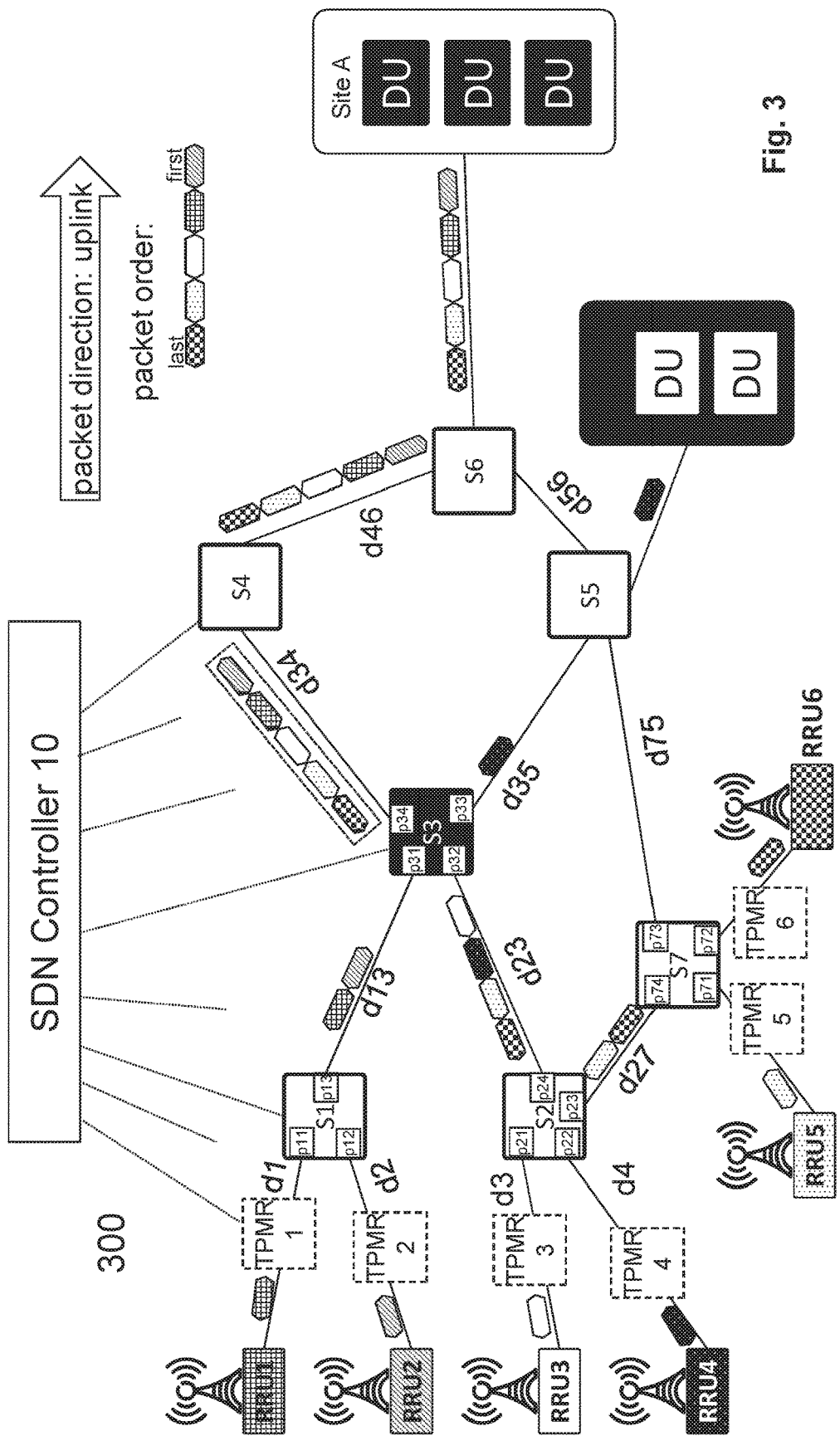
FIG. 3 illustrates another embodiment of a communication network in accordance with the present disclosure.

FIG. 3 shows an embodiment of a communication network 300 in which items of radio equipment in the form of so-called Remote Radio Units (RRUs) and radio equipment controllers in the form of so-called Digital Units (DUs) located at two sites A, B communicate via CPRI over an Ethernet switched transport network domain. Network elements in the transport network domain are denoted S1 to S7 and can be realized as Ethernet bridges or switches. Moreover, further network elements in the exemplary form of Two-Port MAC Relays TPMR 1 to 6 are located in the communication network 300 between an individual RRU and an individual network element S1, S2 and S7 at the edge of the transport network domain.

Each TPMR 1 to 6 may represent a network element 20 as illustrated in FIGS. 1A, 1B and 2A and may be operated as illustrated in FIGS. 2C and 2D. As, in FIG. 3, each network element TPMR 1 to 6 is attached to only a single RRU, and thus receives only a single packet flow, the provision of a single packet gate 32 per TPMR 1 to 6 will generally be sufficient. Of course, two or more of TPMR 1 to 6 could be integrated into a single network element 20, so that the resulting integrated network element 20 will have a number of packet gates 32 that (at least) equals the number of TPMRs integrated therein.

Figure 4:
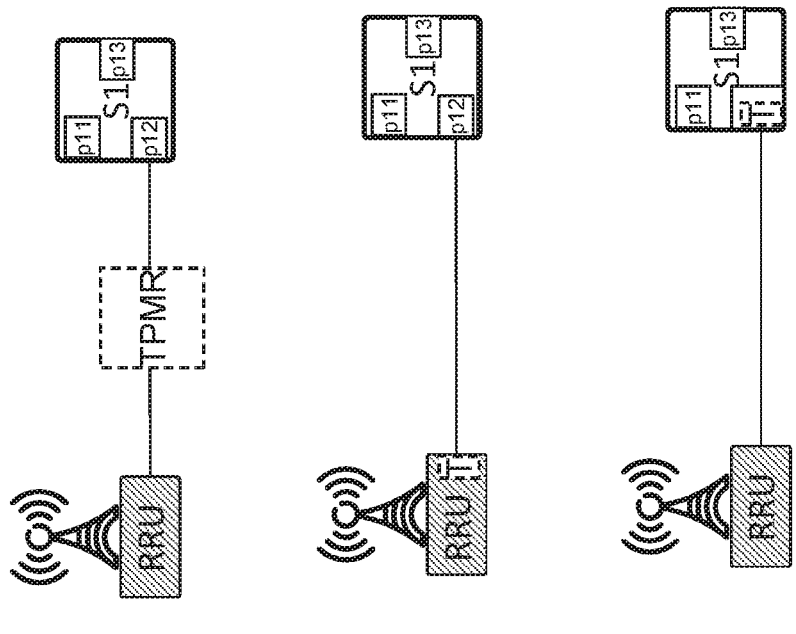
FIGS. 4A to 4C illustrate embodiments for packet gate placement in accordance with the present disclosure.

It will thus be appreciated that an individual TPMR need not necessarily constitute a network element 20 of its own, as exemplarily illustrated in FIG. 4A. Alternatively, an individual TPMR could also be implemented within an RRU (e.g., at an edge or egress port of the RRU as shown in FIG. 4B). Another possibility is to implement the TPMR at the edge, or ingress, port of one of the network elements S1, S2 and S7 at the edge of the transport network domain (as shown in FIG. 4C). Of course, there exist further possible TPMR implementations.

It will further be appreciated that a TPMR is generally used in connection with network bridges. However, the present disclosure could likewise be implemented in connection with network elements performing routing or switching operations.

Returning to FIG. 3, each RRU is marked with a pattern, and exactly the same pattern is used for the packets generated by the respective RRU. As an example, the pattern is "web" for RRU1 and the packet flow generated by RRU1, and "check" for RRU6 and the packet flow generated by RRU6. FIG. 3 exemplarily illustrates uplink patent flows, but the principles presented herein are equally applicable for downlink packet flows.

In the scenario illustrated in FIG. 3, or in similar scenarios, the implementation of an ordered packet transmission mechanism and the creation of (optional) time slots can be realized for the following reasons. First, the packet flows are generated by similar sources, which means in the exemplary case of CPRI that the packet flows are constant bitrate flows with packet rates that equal, or are multiples of, a common base bitrate (e.g., 614.4 Mbps). Second, the relative packet sending times among packet flows from different RRUs are known because they generally utilize the same synchronization reference and, thus, the same timing scheme and typically send their packets simultaneously. It may therefore be assumed that all the RRUs have access to the same time synchronization reference (e.g., because they belong to the same operator, or because different radio operators have access to the same synchronization service). The RRUs, the network elements TPMR 1 to 6 and the network elements S1 to S7 in the transport network (Ethernet) domain can use the same or different clock sources. Third, the delay to cross each link and network element in the transport network domain is known (i.e., can be measured). In the present scenario, the link delay can mean propagation delay and is typically determined by the length of a particular link. The delay to cross a network element S1 to S7 corresponds to the time, or delay, a packet spends to be forwarded over an individual network element S1 to S7 and is also referred to as Residence Time (RT) herein.

Packet processing by the network elements TPMR 1 to 6 and the network elements S1 to S7 in the transport network domain is controlled by a central network controller which, in the present embodiment, takes the form of a Software Defined Network controller (SDNc) 10. The SDNc 10, the network elements TPMR 1 to 6 and, optionally, the network elements S1 to S7 may generally be configured to perform the method steps discussed above with reference to FIGS. 2 and 2B. As such, the SDNc 10 may determine information defining the packet gate opening times and may use that information to program gate opening times and/or other parameters per packet flow at, the network elements TPMRs 1 to 6 and, optionally, the network elements S1 to S7.

The network topology illustrated in FIG. 3 represents a typical fronthaul deployment. In such deployments, often a comparatively simple topology (e.g., a tree structure, a partial mesh structure, limited hop counts, etc.) will be used due to the stringent synchronization and latency requirements of CPRI. It will in the following thus be assumed that each RRU generates a similar CPRI packet flow (e.g., the packet flows have the same constant bitrate).

Moreover, it will be assumed that each packet flow is encapsulated in Ethernet frames having the same size. These assumptions simplify the usage of time slots as they can also have the same size. However, these are optional features.

It should be noted that an Ethernet network is generally an asynchronous network, so that, for example, the start time of a particular time slot is generally not bound to an explicit point in time but is relative to other time slots unless specifically synchronized as explained herein. A time slot corresponds to a particular time interval for packet transmission. A time slot may immediately be followed by another time slot, or a guard interval may be provided between two succeeding time slots (e.g., to guard against timing inaccuracies in the communication network).

Each of the network elements S1 to S7 comprises one or more ingress ports as well as one more egress ports (see also FIGS. 1A and 1B). The ports of an individual network element S1 to S7 in the transport network domain are continuously numbered. In the example of FIG. 3, network element S1 comprises ports p11, p12 and p13, wherein ports p11 and p12 are configured as ingress ports and port p13 is configured as egress port in the uplink processing scenario illustrated in FIG. 3.

The links depicted in FIG. 3 have their transmission delay denoted by di if the link connects an RRU or TPMR to one of the network elements S1, S2 and S7 at the edge of the transport network domain, where i identifies a particular RRU or TPMR. The links have their transmission delay denoted by dij for links between the individual network elements S1 to S7, where i and j identify the two interconnected network elements S1 to S7. Link delay measurements can be performed using standardized approaches such as IEEE 1588 Peer Delay Measurement.

Figure 5:
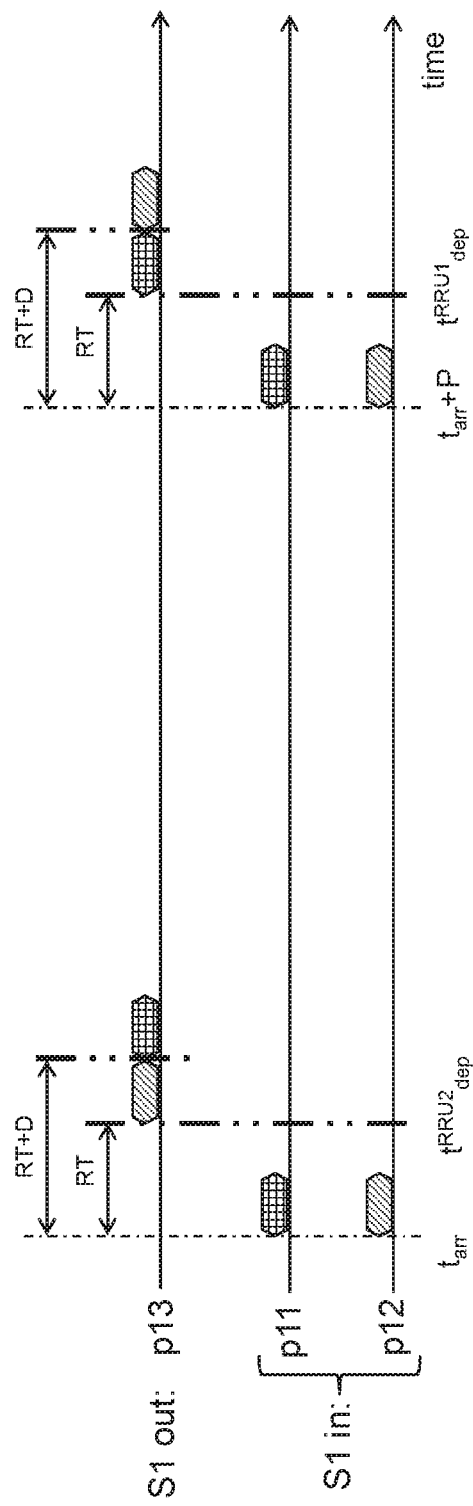
FIG. 5 is a schematic time diagram illustrating a race condition among two packets of different packet flows in the network of FIG. 3.

In the following, the occurrence of an exemplary racing situation between packets of two different packet flows from RRU1 and RRU2, respectively, at network element S1 will be explained with reference to the schematic time diagram of FIG. 5. FIG. 5 thus illustrates the scenario in which the ordered packet transmission mechanism presented herein is not applied.

In the scenario of FIG. 5 it will be assumed that the RRUs create periodic traffic with the same constant bitrate and with a time period P between two subsequent packets of a particular packet flow. Exemplarily assuming that d1 equals d2, the packets of RRU1 and RRU2 arrive at the ingress ports p11 and p12 of network element S1 at the same time tan. Ingress ports p11 and p12 are User Network Interface (UNI) ports of network element S1.

The packet from RRU2 will be sent out by the egress port p13 after the residence time RT, and the packet from the RRU1 will be sent out the packet service time (denoted D) later. The departure time of the packet from RRU2 $t^{RRU2}_{dep}$ thus precedes the departure time $t^{RRu1}_{dep}$ of the packet from RRU1. However, this order among the packets from RRU1 and RRU2 is unpredictable as illustrated for the subsequent packets arriving at $t^{arr}+P$, where $t^{RRU1}_{dep}$ precedes $t^{RRU2}_{dep}$. The corresponding racing situation results in an unpredictable network behaviour and in PDV increases that are not tolerable for time critical packet flows such as the exemplary CPRI packet flows of FIG. 3.

To avoid the racing situation illustrated in FIG. 5, the network elements TPMR 1 to TPMR 6 and/or S1 to S7 are configured to take into account information defining a relative transmission order between the packet flows from different RRUs as generally explained above (e.g., with reference to FIG. 2C). In the present, exemplary scenario, the relative transmission order between different packet flow packets is defined by programmable packet gate opening times at ports of the network elements TPMR 1 to 6 and/or S1 to S7.

Figure 6:
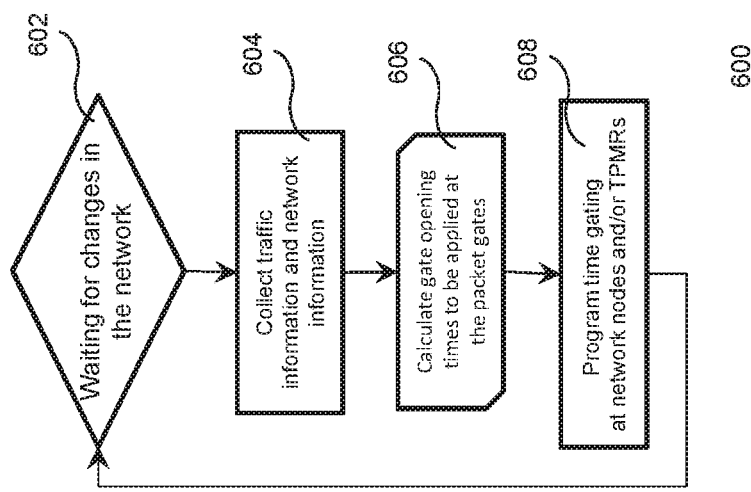
FIG. 6 is a flow chart illustrating a still further method embodiment of the present disclosure.

The packet gate opening times are determined on a per packet gate basis by the SDNc 10 as illustrated in flow chart 600 of FIG. 6.

At an initial step 602, the SDNc 10 waits for a change in the communication network of FIG. 3, including an initial network setup. Then, in step 604, traffic and network information are collected, including, for example, the bitrates of the packet flows, one or more of the parameters di, dij, RT, P, and so on.

In step 606, the packet gate opening times to be applied at the network elements TPMR 1 to 6 and, optionally, S1 to S7 are calculated per package gate 32. Step 606 generally corresponds to step 202 in FIG. 2C. In a further step 608, the packet gate opening times determined at step 606 are programmed at the networks elements TPMR 1 to 6 and, optionally, S1 to S7. Step 608 generally corresponds to step 204 in FIG. 2C.

The programming in step 608 is performed such that the packet gate opening times of a particular packet gate 32 are set such that the packet order of different packet flows of the same traffic handling class (and, optionally, the relative time difference) are assured to remain always the same across the communication network 300. For example, network elements TPMR 1 and 2 will have gate opening times such that the "cross-hatch" packets of RRU2 are always transmitted before the "web" packets of RRU1 by egress port p13 of network element S1 as shown in FIG. 3 on the link between network elements S1 and S3.

The packet gate opening times may be programmed such that a "train of packets" is formed if flows of two or more RRUs are aggregated (see the train of packets transmitted by egress port p13 of network element S1). By using ordered time slots it can be assured that packets of a particular packet flow (from one of the RRUs or DUs) always take the same place within a packet train sent across the transport network domain.

In certain variants, packet gates 32 can be used on all ingress and/or egress ports (UNI ports and Ethernet transport internal trunks). Additional approaches at the respective egress ports, such as IEEE 802.1Qbv, IEEE 802.1Qbu and IEEE 802.3br, can be used to ensure that time critical packets can be transported over the respective network element TPMR 1 to 6 and S1 to S7 without any (further) delay and that packets belonging to time critical traffic take preference over background traffic.

As explained above, the packet gate opening times may be used to "push" each received packet to its dedicated position within set of ordered time slots. As such, the arrival time of the packets at the next network element (i.e., S1 from the perspective of TPMR 1 and 2) become deterministic.

In the following, the advantages achievable using the ingress delay mechanism described above will be explained in more detail with reference to the exemplary communication network of FIG. 3 and the time diagrams illustrated in FIGS. 7 and 8.

Figure 7:
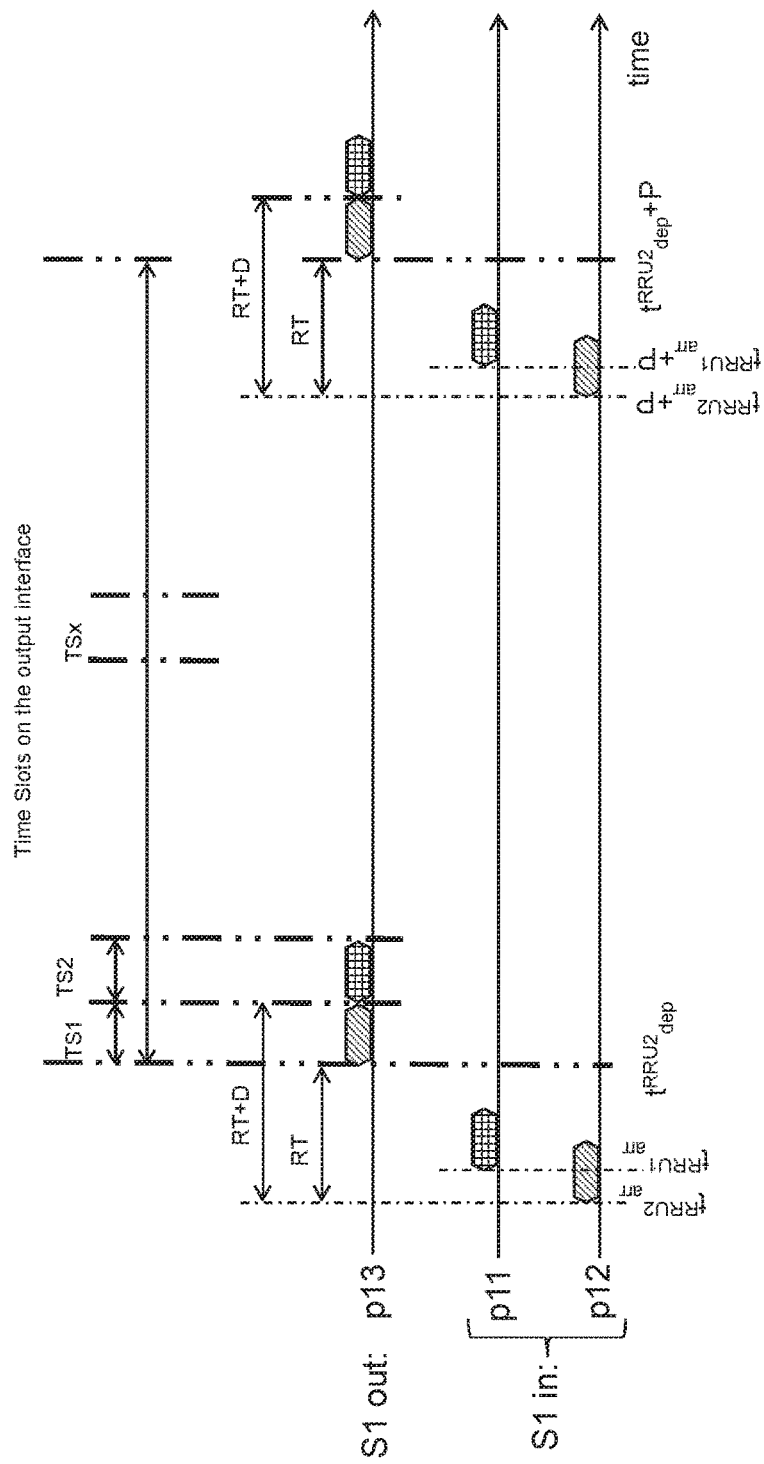
FIGS. 7 and 8 are schematic time diagrams illustrating packet processing embodiments in accordance with the present disclosure.

In the scenario illustrated in FIG. 7, it will exemplarily be assumed that TPMR 1 and TPMR 2 constitute network elements of their own (as illustrated in FIG. 4A). Alternatively, they could be integrated, for example, into the ingress ports p11 and p12 of network element S1 (similar to the scenario illustrated in FIG. 4C). The same principles apply in either case.

With reference to FIG. 7, packets of RRU1 arrive (from TPMR 1) at ingress port p11 of network element S1 at $t^{RRU1}_{arr}$. Packets of RRU2 arrive (from TPMR 2) at ingress port p12 of network element S1 at $t^{RRU2}_{arr}$. The packet arrival time at network element S1 is controlled by the time gating of TPMR 1 and TPMR 2 upstream of network element S1. This means that $t^{RRU1}_{arr}$ is determined by TPMR 1, and $t^{RRU2}_{arr}$ is determined by TPMR 2. The gate opening times of these network elements are programmed by SDNc 10 such that the packets of the packet flows from RRU1 and RRU2 avoid racing. This means that the packets always get to the egress port p13 of network element 20 in the same order, which is ensured by opening the packet gate 32 of TPMR 1 sufficiently later than that of TPMR 2 (assuming that d1 equals d2). It should be noted that the arrival time at the next hop (i.e., network element S1 from the perspective of network elements TPMR 1 and 2) is generally determined by the respective gate opening time and the respective link delay.

When the SDNc 10 sets the gate opening times, it generally takes into account the characteristics of the time critical flows (such as the flow bitrates) and the network parameters (such as the link delays). For example, if a TPMR is implemented in an RRU (as shown in FIG. 4B), then the particular time value for defining a gate opening time depends on the link delays d1 and d2 and on the order of packets from different RRUs to be achieved. If the link delays are the same (i.e., if d1 equals d2), and the goal is to transmit packets from RRU2 consistently before packets from RRU1, then the packet gate of TMPR 1 will be opened sufficiently later than that of TPMR 2 (i.e., $t^{RRU2}_{arr} < t^{RRU1}_{arr}$). This sequence always assures the packet order and packet time spacing as illustrated in FIG. 7.

Time slots are set by the synchronized gate opening times of TPMR 1 and 2 such that an ordering as illustrated in the upper portion of FIG. 7 can be obtained. Specifically, the time slots are defined such that packets from RRU2 are always transmitted in the first time slot TS1, while packets from RRU1 are always transmitted in the following, second time slot TS2.

Figure 8:
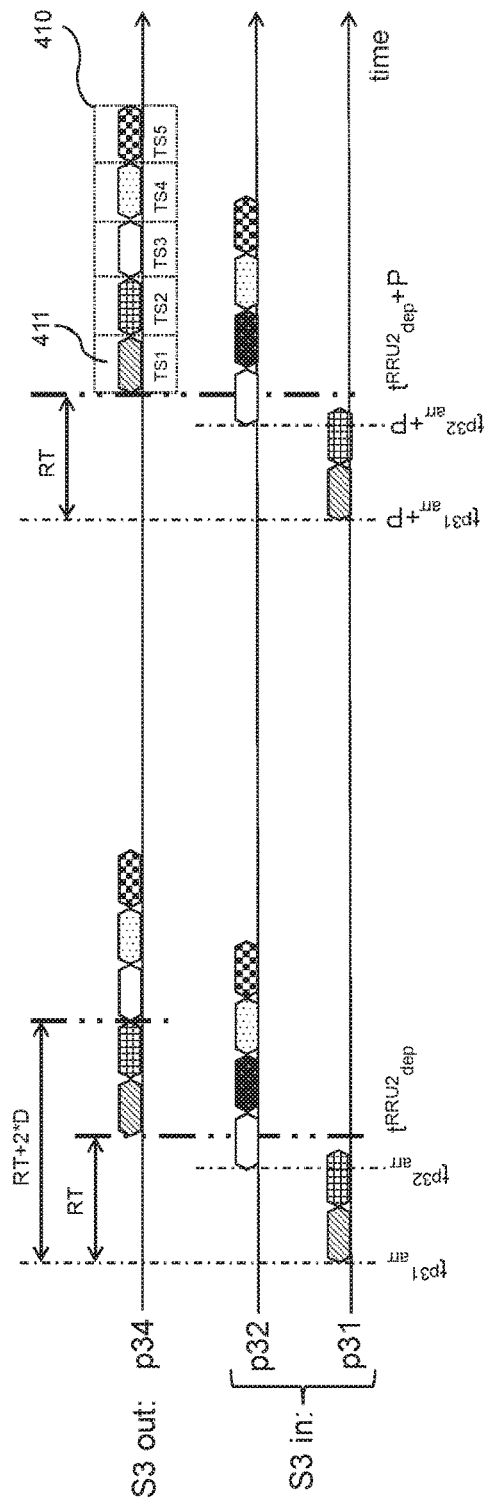

FIG. 8 exemplarily illustrates the operation of the network element S3. As shown in FIG. 3, network element S3 is a core node of the transport network domain downstream of edge nodes S1 and S2. Network element S3 aggregates six time critical packet flows, but forwards the packet flows to different egress ports. That is, five packet flows are forwarded to egress port p34, while one packet flow is forwarded to egress port p33. Network element S3 may implement the time gating mechanism presented herein at both of its egress ports p33, p34 (similar to the other network elements).

Initially, network element S3 receives the already ordered packets of RRU2 and RRU1 at ingress poet p31 (see also FIG. 7), whereas the already ordered packets of RRU3, RRU4, RRU5 and RRU6 are received at ingress port p32. The order between these two trains of packets is controlled such that packets of RRU2 and RRU1 are always received at ingress port p31 before the rest of the packets on ingress port p32. This is achieved by time gating of egress port p13 of network element S1 and time gating of egress port p24 of network element S2 as generally discussed above (e.g., with reference to FIG. 2C). In other words, each of the egress ports p13 and p24 is provided with a packet gate 32 as illustrated in FIG. 1A. The gate opening times of egress ports p13 and p24 are programmed such that packets from egress port p24 of network element S2 are not transmitted (i.e., the packet gate 32 remains closed) until it is ensured that the second packet arrives at ingress port p31 before the first packet on ingress port p32 is received. As said, the SDNc 10 is aware of the link delays throughout the entire communication network 300, including d13 and d23. Therefore, the SDNc 10 can determine the opening and closing times of the gates (see reference numerals 32A and 32B in FIG. 1B) at egress ports p13 and p24 in a suitable manner, as illustrated in FIG. 8.

Due to the packet ordering discussed with reference to FIG. 8, the packets of the time critical packet flows form a train of packets in which each packet of each packet flow always takes the same place, which can be interpreted as the packets having dedicated time slots. It will be understood that the time slots are "virtual" entities and in essence describe a particular order among packets from different packet flows. In the example illustrated in FIG. 8, time slot TS1 belongs to RRU2, and so on.

It will be appreciated that packets from RRU4 ("black" packets) are not transmitted via egress port p34 of network element S3 where the remaining packet train is sent, but on egress port p33. If the packet gate of egress port p34 of network element S3 is programmed to open only once (i.e., for the whole train) and remain closed otherwise, then the packet train is comprised of back-to-back packets as shown in the upper portion of FIG. 8. However, it is also possible to program the gate opening times to have one or more gaps between the packets that are send out, which implies separate gate opening times for individual packet train segments. It will also be possible to define a guard interval between two successive packets of a packet train. In this manner, timing inaccuracies in the communication network can be compensated.

It should also be noted that the time gating mechanism at the edge of the transport network domain could be realized using the draft IEEE standard P802,1Qci Per-Stream Filtering and Policing (if it evolves in a manner suitable to implement the teachings presented herein). It will also be appreciated that all relevant parameters for controlling the gate opening times are available at the centralized SDNc 10 (i.e., the network controller), so that the end-to-end delay in both directions for a specific CPRI packet flow can be predicted. This might be necessary information for the items of radio equipment and the radio equipment controllers for proper radio operation.

Certain implementations of the present disclosure may require time synchronization of the network elements in the transport network domain to permit a synchronized operation of the packet gates. Depending on the particular implementation, also a synchronization (e.g., frequency synchronization) between the radio network domain and the transport network domain (e.g., the Ethernet domain) needs to be ensured. Certain variants of the present disclosure do not require knowledge of the delay a particular packet suffers within a network element (e.g., switching delay) in case the packet gates presented herein are implemented at each network element. However, the present disclosure can also selectively be implemented by network elements at an edge of the transport network domain.

As has become apparent from the above description of exemplary embodiments, the disclosure presented herein can be used to minimize PDV of packet flows of the same traffic handling class by defining a relative transmission order between individual packet flow packets. If desired, the packet flows may be mapped to time slots. The use of time slots may be helpful to create trains of packets with a consistent packet order in terms of the associated packet flows.

While the present disclosure has been described in relation to exemplary embodiments, it is to be understood that this disclosure is only illustrative. Accordingly, it is intended that the invention be limited only by the scope of the claims appended hereto.

The invention claimed is:

1. A system comprising one or more network elements and the system configured to process at least first and second packet flows of the same traffic handling class, each network element having one or more ports, the system comprising:
a first port configured to handle first packet flow packets and a second port configured to handle second packet flow packets;
a first packet gate associated with the first port and a second packet gate associated with the second port, each packet gate being selectively switchable between an open state for packet transmission and a closed state;
at least one first interface configured to receive, from a network controller, information defining opening times for the first packet gate and the second packet gate, the opening times defining a relative transmission order among the first packet flow packets and the second packet flow packets; and
at least one first processor configured to control the first and second packet gates based on the received information to trigger transmission of the first and second packet flow packets in the relative transmission order.

2. The system of claim 1, wherein the relative transmission order is defined such that it controls the transmission of the first and second packet flow packets in accordance with a timing scheme.

3. The system of claim 2, wherein the timing scheme is used to define ordered time slots for the first and second packet flow packets.

4. The system of claim 3, wherein the system comprises multiple network elements and wherein all the multiple network elements apply the same time slot order for the first and second packet flow packets.

5. The system of claim 1, wherein the one or more network elements are located at an edge of a transport network domain to define the relative transmission order of the first and second packet flow packets into the transport network domain.

6. The system of claim 1, wherein the first and second packet gates are configured to operate according to IEEE 802.1Qbv.

7. The system of claim 1, wherein the first and second ports are packet ingress ports.

8. The system of claim 1, wherein the system comprises at least one network element that comprises the first and second ports, the first and second packet gates, the first interface and the first processor.

9. The system of claim 8, wherein the at least one network element is a Layer 2 network bridge.

10. The system of claim 1, wherein each of the one or more network elements comprises one or more Two-Port Medium Access Control Relays (TPMRs), and wherein each TPMR provides at least one packet gate.

11. The system of claim 10, wherein the one or more network elements comprise a first TPMR providing the first packet gate and a second TPMR providing the second packet gate.

12. The system of claim 1, wherein the system comprises at least one first network element that comprises the first port, the first packet gate, the first interface and the first processor; and at least one second network element that comprises the second port, the second packet gate, a second interface and a second processor.

13. The system of claim 12, wherein the first network element constitutes or comprises a first Two-Port Medium Access Control Relay (TPMR), the first TPMR providing the first packet gate, and the second network element comprises a second TPMR, the second TPMR providing the second packet gate.

14. The system of claim 12, wherein the first network element and the second network element are configured as sources of the first packet flow and of the second packet flow, respectively.

15. The system of claim 12, wherein:
the first network element is located between a first source of the first packet flow and a third network element at an edge of a transport network domain; and
the second network element is located between a second source of the second packet flow and the third or a fourth network element at the edge of the transport network domain.

16. The system of claim 1, wherein each of the first and second packet flows is a constant bitrate flow.

17. The system of claim 16, wherein the first and second packet flows have respective bitrates that are equal or are multiples of a common base bitrate.

18. The system of claim 1, wherein the gate opening times are configured to make arrival times of the first and second packet flow packets at the one or more network elements downstream of the first and second packet gates deterministic.

19. The system of claim 1, wherein two or more different traffic handling class levels are defined, and wherein the first and second packet flows belong to different traffic handling classes on a lower class level and to the same traffic handling class on a higher class level.

20. The system of claim 1, wherein:
the system is further configured to process at least one third packet flow having no traffic handling classification or a traffic handling classification lower than the first and second packet flows;
at least one of the first and second ports is configured to receive a third packet flow packet; and
the at least one first processor is further configured to prevent transmission of the third packet flow packet until the first and second packet flow packets have been transmitted.

21. The system of claim 20, wherein the at least one first processor is further configured to prevent the third packet flow packet from being transmitted by prioritizing the transmission of the first and second packet flow packets in accordance with a technique as defined in at least one of IEEE 802.1Qbv, IEEE 802.1Qbu, and IEEE 802.3br.

22. The system of claim 21, wherein the third packet flow packet bypasses the first and second packet gates.

23. The system of claim 1, wherein the first and second packet flows comprise Ethernet layer traffic.

24. The system of claim 1, wherein the system further comprises or interfaces a fronthaul network domain.

25. A network controller configured to control processing of at least first and second packet flows of the same traffic handling class by a system having a first packet gate associated with the first packet flow and a second packet gate associated with the second packet flow, the network controller comprising:
a processor configured to determine information defining opening times for the first packet gate and the second packet gate, wherein the first packet gate is associated with a first port and the second packet gate is associated with a second port, wherein the first port handles first packet flow packets and the second port handles second packet flow packets, wherein each packet gate is selectively switchable between an open state for packet transmission and a closed state, and wherein the opening times define a relative transmission order among the first packet flow packets and the second packet flow packets; and an interface configured to send the information to the system, wherein the information is employed to program the opening times of the first packet gate and the second packet gate.

26. The network controller of claim 25, wherein the information defining the relative transmission order is sent to multiple network elements in the system to define the same packet order throughout a communication network.

27. The network controller of claim 25, wherein the network controller is further configured to calculate the opening times based on at least one of:
a residence time of the first and second packet flow packets in a network element; and
one or more link delays.

28. The network controller of claim 25, wherein the network controller is further configured to calculate the opening times based on at least one of:
a bitrate underlying at least one of the first and second packet flows; and
a packet sending time of one or more upstream network elements sending the first and second packet flows towards the first and second packet gates, respectively.

29. The network controller of claim 25, wherein the network controller is implemented as controlling entity of a Software Defined Network (SDN).

30. A method of operating a system comprising one or more network elements and the system configured to process at least first and second packet flows of the same traffic handling class, each network element having one or more ports and the system comprising a first packet gate and a second packet gate, the method comprising:

receiving, from a network controller, information defining opening times for the first packet gate and the second packet gate, wherein the first packet gate is associated with a first port and the second packet gate is associated with a second port, wherein the first port handles first packet flow packets and the second port handles second packet flow packets, wherein each packet gate is selectively switchable between an open state for packet transmission and a closed state, and wherein the opening times define a relative transmission order among the first packet flow packets and the second packet flow packets;

receiving the first packet flow packets at the first port and the second packet flow packets at the second port; and controlling the first and second packet gates based on the received information to trigger transmission of the first and second packet flow packets in the relative transmission order.

31. A method of operating a network controller configured to control processing of at least first and second packet flows of the same traffic handling class by a system having a first packet gate associated with the first packet flow and a second packet gate associated with the second packet flow, the method comprising:

determining information defining opening times for the first packet gate and the second packet gate, wherein the first packet gate is associated with a first port and the second packet gate is associated with a second port, wherein the first port handles first packet flow packets and the second port handles second packet flow packets, wherein each packet gate is selectively switchable between an open state for packet transmission and a closed state, and wherein the opening times define a relative transmission order among the first packet flow packets and the second packet flow packets; and sending the information to the system, wherein the information is employed to program the opening times of the first packet gate and the second packet gate.

* * * * *